Jan. 5, 1965   P. H. MITCHELL   3,164,458
BUSHING FOR THE PRODUCTION OF THERMOPLASTIC FIBERS
Filed Dec. 8, 1960   2 Sheets-Sheet 1

INVENTOR.
PAUL H. MITCHELL
BY Oscar L. Spencer
ATTORNEY

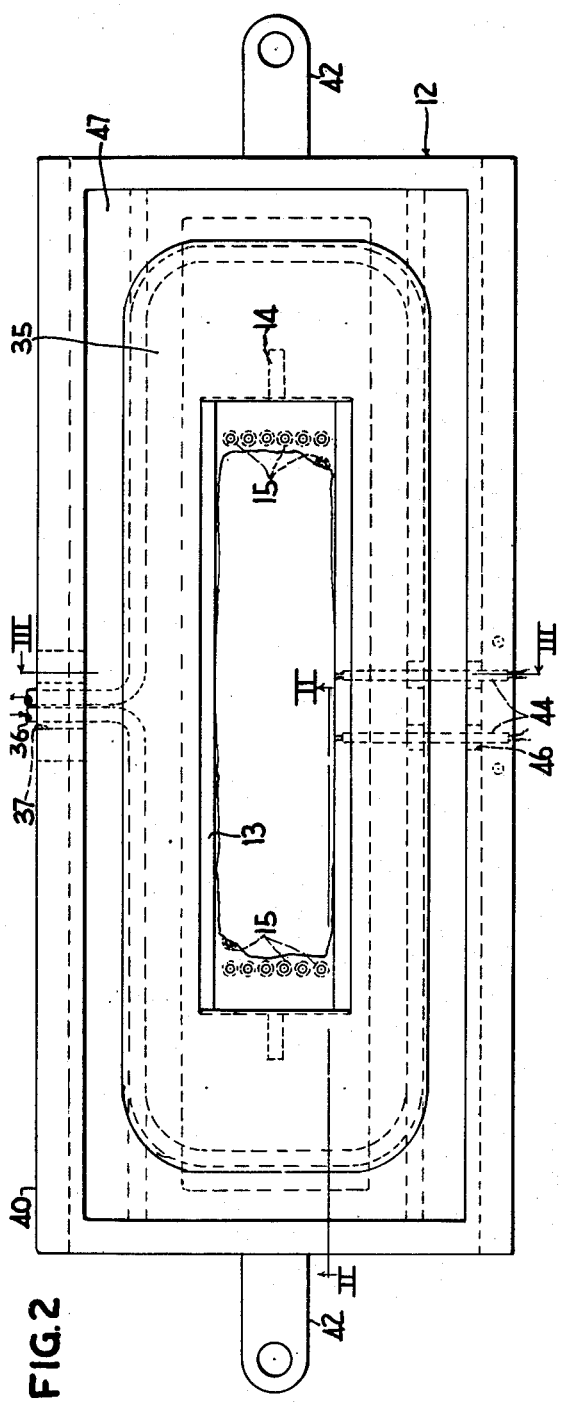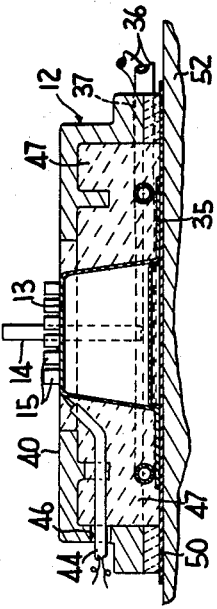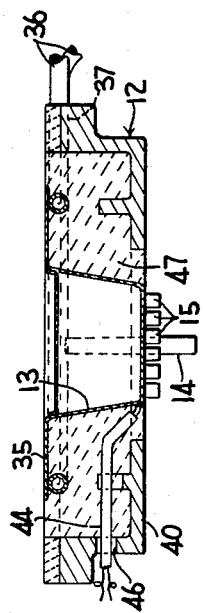
INVENTOR.
PAUL H. MITCHELL
BY
Oscar D Spencer
ATTORNEY

United States Patent Office 3,164,458
Patented Jan. 5, 1965

3,164,458
BUSHING FOR THE PRODUCTION OF THERMOPLASTIC FIBERS
Paul H. Mitchell, Shelbyville, Ind., assignor to Pittsburgh Plate Glass Company, Pittsburgh, Pa., a corporation of Pennsylvania
Filed Dec. 8, 1960, Ser. No. 74,688
1 Claim. (Cl. 65—12)

This invention is concerned with a metal feeder for the production of thermoplastic fibers, and it has particular relation to a simple method of constructing a feeder and support for it to enable it to operate more efficiently in the formation of thermoplastic fibers such as glass fibers. In the glass fiber art such feeders are referred to as bushings, and the description of the invention in the specification and claim will employ the term "bushing" as a generic term for metal feeders.

It is known to employ electrically heated, metal alloy bushings in apparatus suitable for manufacturing glass fibers. The bushings have a plurality of circular orifices in them through which molten glass flows in the form of streams. The streams are subsequently attenuated into fibers. The bushing is made of an alloy capable of withstanding the temperature of molten glass, and it is capable of being heated to temperatures approximating fiber forming temperature of the glass by the passage of electric current through it. The glass is heated in the bushing by conduction of the heat from the bushing. One alloy which has been employed to manufacture bushings is a platinum-rhodium alloy containing about 87 to 90 percent platinum and 10 to 13 percent rhodium.

The bushing is constructed in the form of a rectangular trough having flanges extending from the tops of the sides of the trough to support the bushing on surrounding refractory insulating material. The orifices through which the glass passes are formed in rows in the bottom of the trough-like bushing and short projections or tips extend from the orifices in the bottom of the bushing to direct the glass streams. The diameter of the orifices may range from about 0.03 to 0.35 inch and the orifices are arranged in rows extending along the length of the bushing, there being, for example, 1 to 20 rows having 30 to 50 or more tips in each row. Terminals in the form of strips of the platinum alloy are welded to opposite ends of the bushing. These terminals are connected to bus bars to supply current to the bushing. This type of bushing has been employed in the manufacture of fine, staple fibers according to the process shown in U.S. Patent No. 2,489,243 and in the manufacture of continuous strands according to the process shown in U.S. Patent No. 2,133,238.

The critical point in the fiber forming process is where the fibers are pulled from the bushing tips and stretched out to form the filaments. The molten glass forms as an inverted cone hanging from the bushing tip and the filament is pulled from the apex of the cone. The glass is heated in the bushing to a temperature at which it is quite fluid in order to insure that the glass is in a highly refined state. At this temperature, it is much too fluid for fiber forming, and it must be cooled by the time it reaches the cones so that it is viscous enough for fiber forming. Some cooling of the glass is accomplished as it passes through the bushing tips and the glass is cooled to fiber drawing temperature as it is exposed to the atmosphere while it is suspended in the cone. Artificial cooling of the glass in the cone may also be employed.

One of the problems in the formation of fibers according to either of the above processes is to maintain the temperature of the bushing and the temperature of the glass passing through the orifices in the bushing uniform throughout the length of the bushing. If the temperature of the bushing varies along its length, the temperature and viscosity of the glass passing through orifices in the bushing will differ along the length of the bushing and the diameter of the fibers formed from the streams passing through the orifices will then be different. This is undesirable for it makes it difficult to maintain control of the fiber forming process. It is especially undesirable in the process for forming short staple fibers, for in order to obtain maximum production in such process, it is necessary that the primary filaments from which the short staple fibers are formed are of maximum, uniform diameter. It is undesirable in a continuous strand process for in this case the yarn formed does not conform to fiber diameter specifications.

Each bushing which is employed in the fiber forming processes is manufactured as a bushing unit which is made up of the platinum alloy bushing, a metal support surrounding the bushing and refractory insulation between the support and the bushing. The support is provided with suitable lugs to permit the unit to be mounted underneath and in line with an opening in the forehearth. When a bushing becomes worn out or damaged, the entire bushing unit is simply replaced with a new bushing unit.

In the past the bushing units have been constructed by cementing properly shaped blocks of refractory material into place between the support and the bushing. This is time-consuming and requires the skill of a bricklayer to properly fit the refractory blocks into the space between the bushing and support and seal them completely so as to provide the proper insulation. This method of forming the bushing unit is also undesirable for it requires the stocking of many different sizes of refractory blocks for the different size bushings which are employed in the different processes. This type of construction is further unsatisfactory, for if the blocks are not perfectly positioned and all crevices completely sealed, there are heat leaks in the insulation and local cold spots appear in the bushing which result in non-uniformity of glass temperature, viscosity and fiber diameter along the length of the bushing. This is especially true of the fit of the refractories around cooling tubes and thermocouple wires which are usually included in the bushing unit.

It is an object of the present invention to provide a bushing unit and a method of constructing the bushing unit which is simple and quick, does not require the inventory of a substantial number of refractory block sizes and which results in a completely and uniformly sealed and insulated bushing unit. It is also an object of this invention to provide a bushing unit in which the bushing can be heated uniformly throughout its length.

In accordance with the invention these objects are achieved by constructing the bushing in a particular manner. The bushing is constructed by positioning the bushing and support therefor in proper spaced relation to each other, pouring an aqueous slurry of a castable refractory material in between the two elements and drying the refractory material to set it and adhere the bushing and support together. The bushing unit is then heated to remove all the moisture from the refractory material. The bushing unit as thus prepared is ready for installation in the fiber forming process. The heat of the glass flowing through the bushing causes the refractory material in the bushing unit to be finally set.

The invention is further described in conjunction with the drawings in which:

FIG. 2 is a plan view of the bushing unit;

FIG. 4 is a view in section taken along lines III—III of FIG. 2; and

FIG. 5 is an inverted sectional view similar to FIG. 4 illustrating the method of manufacturing the bushing unit.

Figure 1:
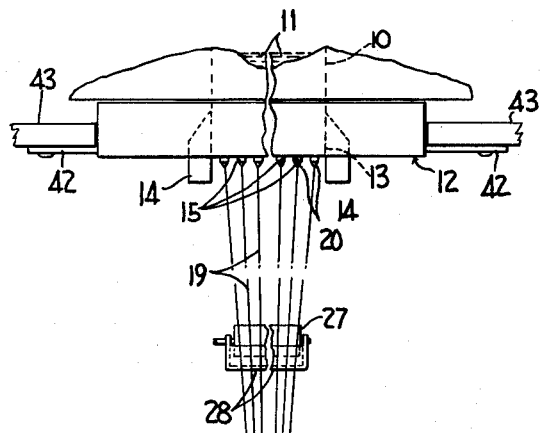
FIG. 1 is an elevation of a fiber forming process illustrating the bushing unit in combination with other fiber forming apparatus.

In FIG. 1 of the drawing there is shown a forehearth 10 of a glass melting furnace containing a supply of molten glass 11 and having a bushing unit 12 attached to the bottom of the forehearth and centered under an opening in the bottom of the forehearth. The bushing unit is composed of a bushing 13 made of a platinum-rhodium alloy containing approximately 90 percent by weight platinum and the bushing is trough-like in shape. The bushing is heated by electric current which is passed through terminals 14 connected to the ends of the bushing. The bottom face of the bushing is provided with a series of orifices with a hollow tip 15 defining and extending downwardly from each orifice. The tips 15 are formed in a number of rows so that there are a plurality of tips extending from the bushing.

Glass filaments 19 are pulled from cones of glass 20 which are suspended from each of the tips 15. These filaments are pulled at a very high rate of speed, i.e. 5,000 to 20,000 feet per minute and wound on a rapidly rotating forming tube 22. The filaments are grouped into a strand 24 as they pass over a gathering guide 26 prior to their being wound on the forming tube 22. Usually a size made up of a liquid binder and lubricant, such as a combination of starch and vegetable oil, is applied to the filaments as they pass over a rotating roller 27 mounted in a container 28 holding a supply of the size. As the strand 24 is wound on the tube 22, it is rapidly traversed along the length of the tube by means of a suitable rotating traverse mechanism 30.

Figure 3:
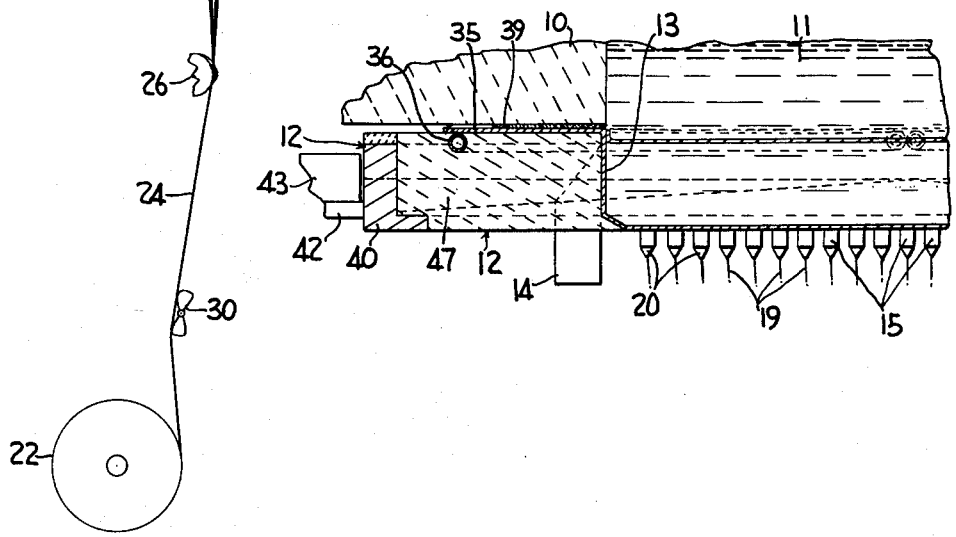
FIG. 3 is a view in section taken along lines II—II of FIG. 2 with portions of the glass furnace forehearth added in section.

The bushing unit of the present invention is shown in further detail in FIGS. 2 to 4. The bushing 13 has a flange 35 extending in a horizontal plane from the tops of the sides of the bushing. The flange is continuous and extends completely around the bushing. Mounted directly underneath the flange in touching relation therewith is a stainless steel cooling tube 36 which enters the bushing unit from one side through an opening 37 in the supporting frame 40 and travels around the bushing and exits from the unit at the opening 37 where it enters. This cools the flange of the bushing so that when the bushing unit is in place, the glass which tends to seep sideways from the forehearth into the space between the bushing flange and the forehearth is cooled and solidified at point 39 just above the flange of the bushing 13. Thus, a glass seal is formed between the bushing unit 12 and the forehearth 10.

The supporting member for the bushing unit is a manganese-bronze alloy frame 40 which is also trough-like in shape and is of greater size than the bushing. The frame 40 is open at the bottom to permit the bottom of the bushing 13 to be exposed through this opening. The frame has two lugs 42 extending from its ends, and these lugs are drilled to provide for the aligning of the lugs to the furnace forehearth supporting structure 43 by means of dowels. The outer edges of the flange 35 are spaced from the inner walls of the frame 40. A thermocouple 44 is welded to one side wall of the bushing at about the mid-point along the length of the bushing and the thermocouple 44 extends from the bushing out through opening 46 in the frame 40.

In between the frame 40 and the bushing 13, there is poured a castable refractory material 47 which fits closely against all the surfaces of the bushing 13, tube 36, thermocouple 44 and frame 40. This material is a refractory material which is designed for withstanding the temperatures of operation of the bushing. A suitable material is an aluminum silicate powder capable of withstanding a temperature of 2600° F. and which is commercially available as a castable refractory material. The refractory material has the following chemical analysis in percent by weight: 36.7% $SiO_2$, 52.6% $Al_2O_3$, 0.7% $TiO_2$, 1.2% $Fe_2O_3$, 7.3% CaO, 0.2% MgO, 1.2% alkalies and 0.1% ignition loss. The castable refractory material is poured as an aqueous slurry into the space between the bushing 13 and the frame 40 and completely fills this space, surrounding closely the thermocouple 44 and cooling tube 36, so as to provide complete and uniform insulation between the bushing and the frame. It is important that the refractory material fits closely around all parts of the bushing unit so that there are no voids which will provide paths for excessive heat loss from localized portions of the bushing.

The method of producing the bushing unit 12 can be described in conjunction with FIG. 5. A sheet of tin 50 is placed on a table 52 or other flat surface. The bushing 13 is then turned upside down and placed with the flange 35 on the surface of the tin sheet 50. The thermocouple 44 has previously been welded to the side of the bushing. The top surfaces of the frame are provided with a coating of sillimanite cement which is approximately 1/16 inch in thickness and the frame is then turned upside down and placed in surrounding relation to the bushing 13 on the tin sheet 50. The bottom of the bushing is then level with the bottom of the frame 40. The bottom of the bushing, especially the tip section, is covered with masking tape. The cooling tube 36 is then positioned on the flange 35 of the bushing 13 and is held in place by gravity. The cooling tube 36 and thermocouple 44 are fitted through openings 37 and 46 respectively in the frame 40.

The castable refractory material 47 is then mixed with a suitable amount of water to a trowelable consistency. The space between the bushing and the frame is filled by pouring and troweling the castable refractory material in the opening between the bottom of the bushing and the bottom of the frame. The castable refractory material flows to all sections of the space and completely and uniformly fills it. The castable refractory material is leveled off so that it is level with the bottom of the bushing and the frame.

This assembly is allowed to air dry for about one hour. This hardens the refractory material and adheres all of the elements of the bushing unit to each other through the adhesive nature of the refractory material. The unit is then baked at about 200° F. until all moisture is removed from the castable refractory material. This will take about three to four hours. The baking or prefiring removes all of the water and prevents steaming and cracking of the bushing unit when it is subjected to the heat of the fiber forming operation. The baking or prefiring also minimizes the shrinking of the castable refractory material and permits a tight fit between all of the elements of the bushing unit. The bushing unit as thus manufactured is ready for installation under a forehearth. The castable refractory material is finally and completely set as the bushing unit is exposed to the heat of the molten glass flowing through it.

As can be seen from the above description, the present invention provides a simple method of making a bushing unit. This method avoids the necessity for stocking many sizes of refractory blocks and avoids the difficulties involved when the blocks are of improper size and do not fit properly in between the bushing and frame of the bushing unit. The bushing unit is easier and cheaper to assemble than prior art bushing units. It has also been observed that the bushing as thus constructed has effected a reduction in the heat loss normally experienced in bushing units of the same size and that the bushing requires less electrical current to heat it to the proper temperature. The operation of a bushing unit as thus described has been observed to be more uniform due to the fact that a more uniform temperature is maintained throughout the length of the bushing. A more efficient fiber forming has resulted from use of the bushing units prepared as described above.

Although the present invention has been described with respect to specific details of certain embodiments thereof, it is not intended that such details serve as limitations upon the scope of the invention except insofar as set forth in the accompanying claim.

I claim:

A bushing unit for producing thermoplastic fibers which comprises a bushing, a frame in spaced relation to the bushing, and a mass of refractory material cast in situ between the bushing and the frame forming a rigid sealed unit, the bushing and the frame being adhered to the refractory material and thermally insulated from each other.

References Cited in the file of this patent

UNITED STATES PATENTS

| | | |
|---|---|---|
| 1,161,194 | Cook | Nov. 23, 1915 |
| 1,721,442 | Frink | July 16, 1929 |
| 1,731,280 | Warren | Oct. 15, 1929 |
| 1,837,723 | McGraw | Dec. 22, 1931 |
| 2,267,019 | Esser | Dec. 23, 1941 |
| 2,527,500 | Norton | Oct. 24, 1950 |
| 2,908,036 | Russell | Oct. 13, 1959 |
| 2,949,633 | Drummond et al. | Aug. 23, 1960 |

FOREIGN PATENTS

| | | |
|---|---|---|
| 216,851 | Australia | Aug. 28, 1958 |